Dec. 8, 1931.  R. L. HICKMAN  1,835,871
AUTO DASHBOARD ATTACHMENT
Filed May 12, 1930
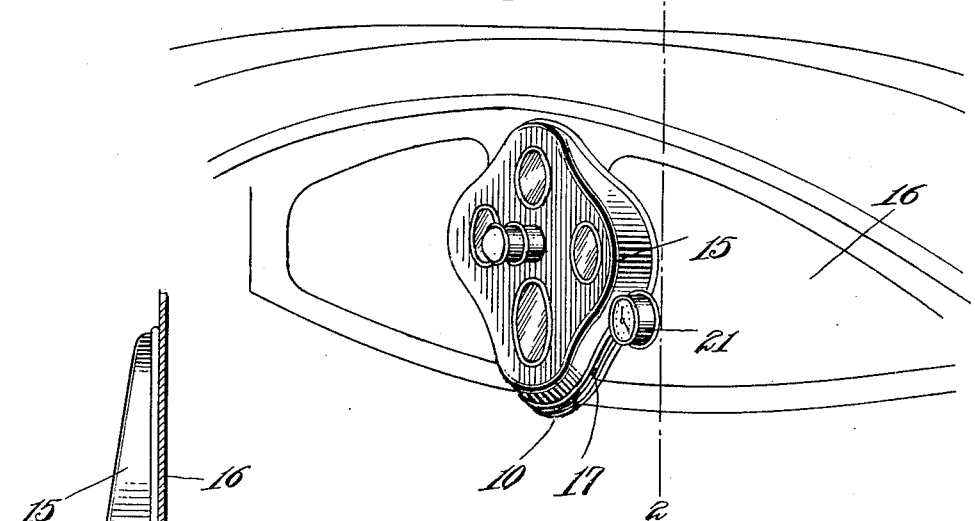
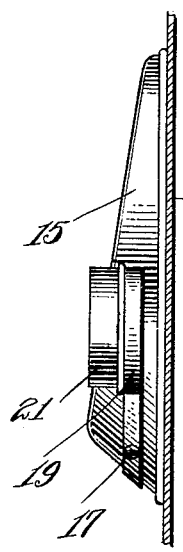
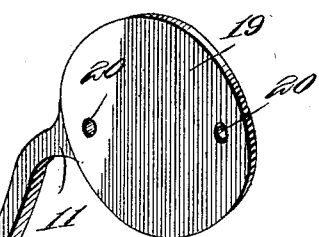
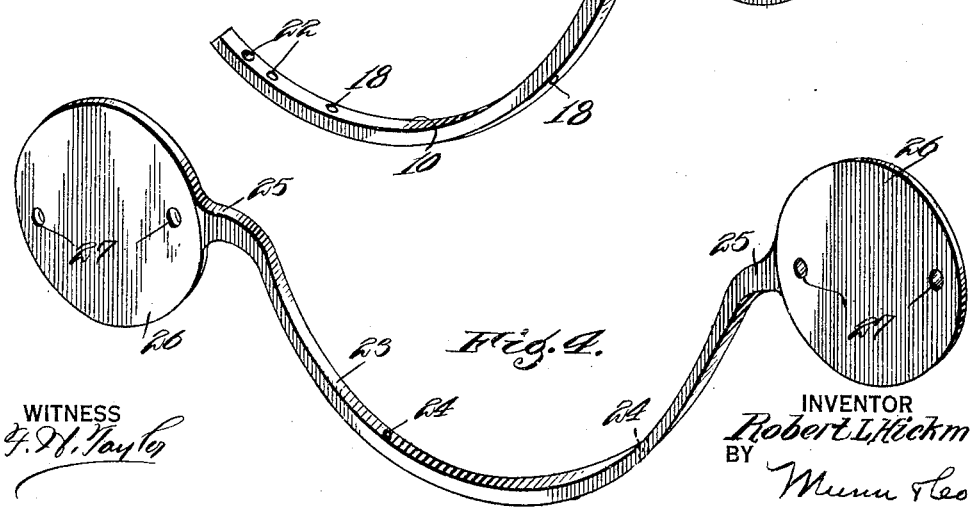
WITNESS
F. H. Tayler
INVENTOR
Robert L. Hickman
BY
Munn & Co
ATTORNEY Patented Dec. 8, 1931

1,835,871

UNITED STATES PATENT OFFICE

ROBERT L. HICKMAN, OF BUTTE, MONTANA

AUTO DASHBOARD ATTACHMENT

Application filed May 12, 1930. Serial No. 451,829.

My invention is an auto dash board attachment and an object of the same is to provide a device of this character whereby auxiliary instruments may be supported from the instrument panel of a well known motor vehicle now on the market.

A further object of the invention is to provide a device of this character which is supported in place on the walls of the instrument panel and thus make it unnecessary to drill holes in the dash board. More specifically the invention contemplates a bracket which is shaped to embrace the instrument panel so as to utilize the latter in lending rigidity to the bracket and thereby eliminate vibration between the instrument attached to the instrument panel.

Another object of the invention is to provide an article of manufacture embodying a curved attaching arm or bracket and an instrument supporting plate extending laterally from one end thereof, and which is formed as a unitary casting.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a perspective of my invention in operative position on an automobile instrument panel;

Fig. 2 is a vertical section taken on substantially the line 2—2 of Fig. 1;

Fig. 3 is a perspective of the attachment; and

Fig. 4 is a perspective of a modified embodiment of the invention.

Referring to the embodiment of the invention disclosed in Figs. 1 to 3 inclusive a longitudinally curved arm or bracket 10 having a lateral extension 11 at one end is provided.

The bracket or arm 10 is adapted to embrace the underside of an instrument panel 15 which projects laterally from the inner face of the automobile dash board 16. Removable fastenings 17 extend through transverse openings 18 in the arm or bracket to hold the same to the instrument panel.

As shown particularly in Fig. 1 the arm or bracket is positioned so that the extension 11 will lie slightly below the horizontal center line of the instrument panel.

A circular vertically extending plate 19 is cast with the extension 11 and is disposed laterally thereof to overlie the dash board 16. Openings 20 are provided in the plate 19 for securing a time piece or other suitable instrument 21 on the circular plate.

If desired a cigar lighter or electric lamp may be mounted upon the arm or bracket 10 and for this purpose the inner end of the latter is provided with a pair of transverse openings 22 for the reception of fastenings to hold the lighter or lamp in place.

In Fig. 4 a modification of the invention is disclosed. In this instance a longitudinally bowed or substantially U-shaped arm or bracket 23 is provided. Transverse openings 24 are formed in the bracket for holding the same to the instrument panel. Each end of the arm or bracket terminates in a lateral extension 25 and an instrument supporting plate 26 is formed with each extension. Openings 27 are formed in the plate for securing suitable instruments thereto.

With both embodiments of the invention it will be seen that the arm or bracket conforms to the configuration of the under-side of the instrument panel and is attached directly thereto. It will therefore be manifest that with my invention additional instruments may be mounted on the dash board of the automobile and yet it is unnecessary to drill openings therein.

What is claimed is:

1. As an article of manufacture a longitudinally curved arm adapted to embrace the side walls of a motor vehicle instrument panel and to be secured thereto, and a vertically disposed plate carried by one end of the arm and disposed laterally thereof.

2. As an article of manufacture a device for supporting an additional instrument on the instrument panel of an automobile, a longitudinally curved arm shaped to conform to the contour of the panel and adapted to be secured thereon, and a plate formed with one end of the arm and lying laterally thereof and upon which the additional instrument is adapted to be secured.

3. As an article of manufacture a device for mounting additional instruments on the instrument panel of an automobile, a substantially U-shaped member adapted to embrace the laterally projecting side walls of the instrument panel, means for securing the substantially U-shaped member in place, and a laterally extending plate formed with each end of the substantially U-shaped member and upon each of which an instrument is adapted to be secured.

ROBERT L. HICKMAN.